United States Patent [19]

Middleton

[11] 4,136,889

[45] Jan. 30, 1979

[54] COLLAPSIBLE TROLLEY

[75] Inventor: John R. Middleton, London, England

[73] Assignee: M.S. Precision Products Limited, London, England

[21] Appl. No.: 784,448

[22] Filed: Apr. 4, 1977

[51] Int. Cl.² ............................................. B62B 1/04
[52] U.S. Cl. ...................................... 280/30; 280/43;
280/47.18; 280/47.24; 280/47.26
[58] Field of Search ........................... 280/47.2–47.27,
280/30, 43, 651–654, 79.1, 63, 64, 47.37

[56] References Cited
U.S. PATENT DOCUMENTS 1,005,063  10/1911  Norditron et al. ............ 280/47.24 X
3,873,118  3/1975  Takagi .......................... 280/47.24 X

FOREIGN PATENT DOCUMENTS 125961  11/1947  Australia ................................. 280/47.2

Primary Examiner—Joseph F. Peters, Jr.
Assistant Examiner—Norman L. Stack, Jr.
Attorney, Agent, or Firm—William Anthony Drucker

[57] ABSTRACT

A trolley comprising a substantially rectangular support framework and wheels mounted on one end of support arms, the other ends of the arms being pivoted to the framework and the arms being movable to several positions so that the trolley can be used for different purposes.

3 Claims, 6 Drawing Figures

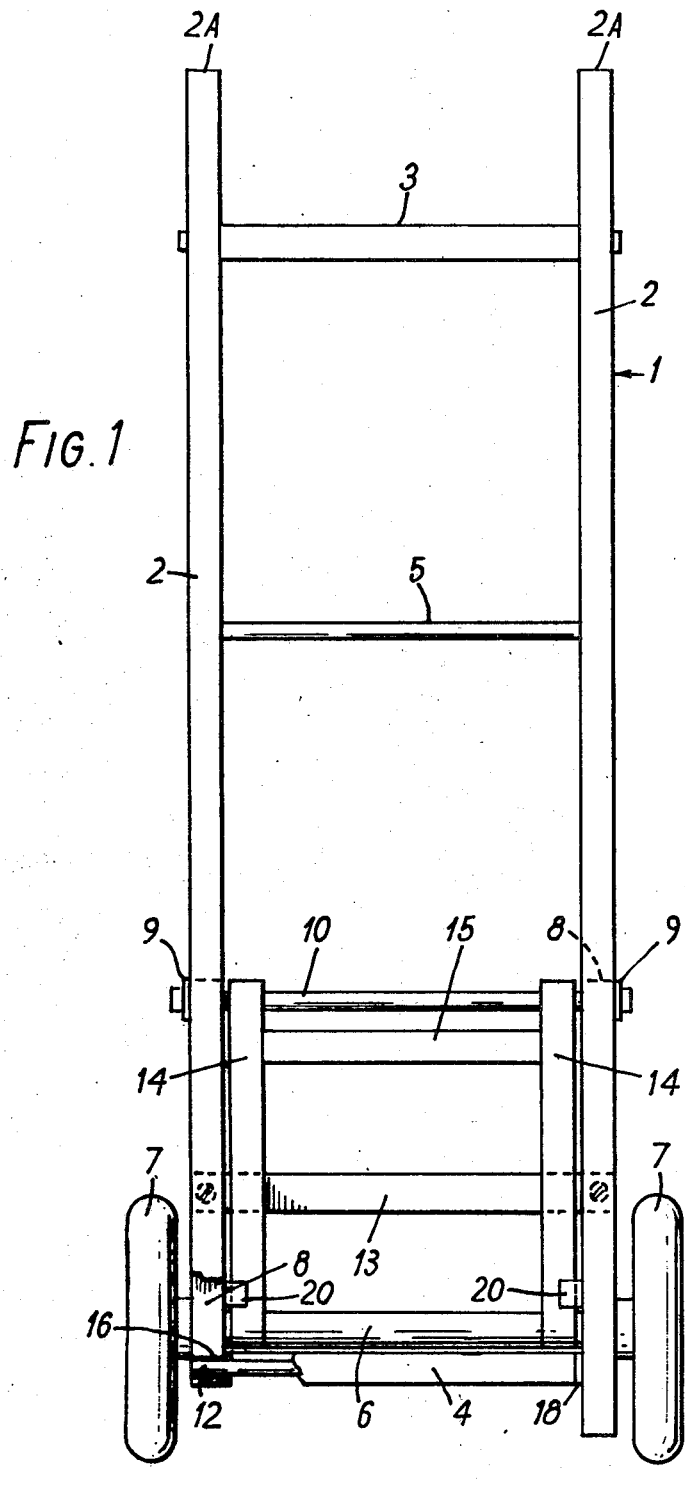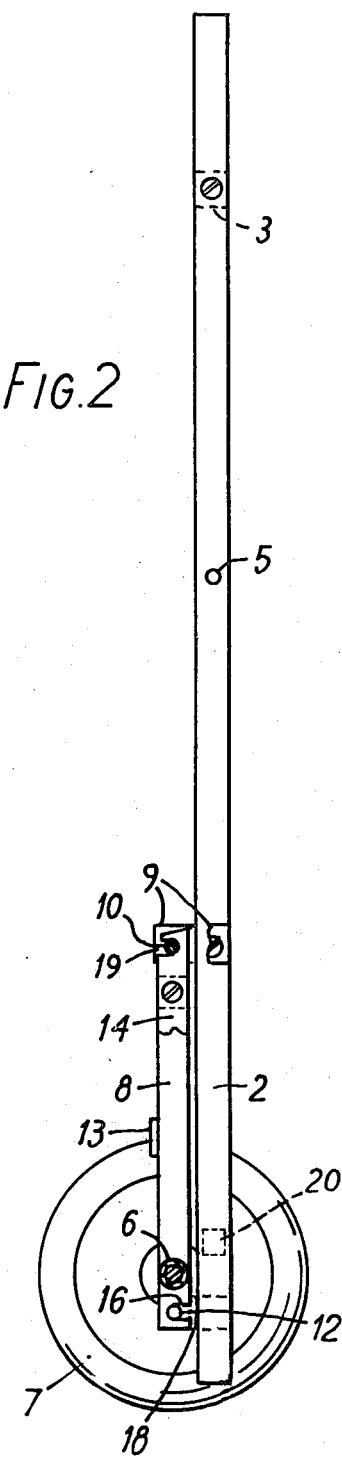

COLLAPSIBLE TROLLEY

The present invention relates to a convertible trolley.

According to the present invention there is provided a trolley comprising a substantially rectangular support framework and a pair of wheels or rollers rotatably mounted on one end of support arms, the other ends of which arms are pivoted to the framework and are movable from at least one position in which the wheels or rollers lie at or near one end of the framework with their axis closely adjacent to the framework and to another position in which the axis is disposed at a greater distance from the framework or close to the framework but at some distance from said first position.

Preferably, the trolley includes means for retaining the arms in said positions and the retaining means may include a U-shaped opening in each support arm and a rod mounted on the framework at said end thereof engageable in the U-shaped openings.

Advantageously, the trolley includes a U-shaped opening in the bar and the retaining member is a rod mounted on the framework transversely thereof and engageable with this U-shaped opening.

A constructional embodiment of the present invention will now be described, by way of example, with reference to the accompanying drawings wherein:

FIG. 1 shows a front elevation of the trolley in one position of the wheels;

FIG. 2 shows a side elevation of the trolley in that position; and

FIGS. 3, 4, 5 and 6 show converted conditions in which the trolley can be used.

The trolly comprises a substantially rectangular support framework 1 having a pair of spaced parallel side members 2, upper and lower cross-bars 3 and 4 and an intermediate transverse retaining member in the form of a rod 5.

Ground engaging means in the form of a pair of wheels 7 are rotatably mounted on an axle 6 near one end of a pair of arms 8, the other ends of which are pivotably mounted on support brackets 9 carried by the side members 2, the pivots for the arms 8 comprising a transverse rod 10 which also serves as a retaining member as will be described. The brackets 9 are mounted at a distance from the cross bar 4 so that when the arms 8 lie against the members 2 parallel therewith as shown in FIG. 2, the wheels 7 are at, or near, one end of the framework 1 with their axis closely adjacent to the framework. Parallel with the bar 4 and fixed to it by brackets 18 there is provided a transverse retaining rod 12 and the arms 8 are provided with retaining means in the form of U-shaped openings 16 which can be forced on to the retaining rod 12 to hold the arms 8 frictionally in their positions shown in FIG. 2. The arms 8 carry a transverse support plate 13.

On the axle 6 there are pivotably mounted a pair of bars 14 connected together at their ends remote from the axle 6 by a cross-bar 15. The bars 14 are provided with retaining means in the form of U-shaped openings 19 at their ends remote from the axle 6 which can be forced into engagement with the retaining rod 10. In this position and when the openings 16 in the arms 8 are locked on to the retaining rod 12, the trolley is in the position shown in FIG. 2 suitable for storage. The trolley can hang from a wall bracket by means of the cross-bar 3.

Figures 3, 4, 5, 6:
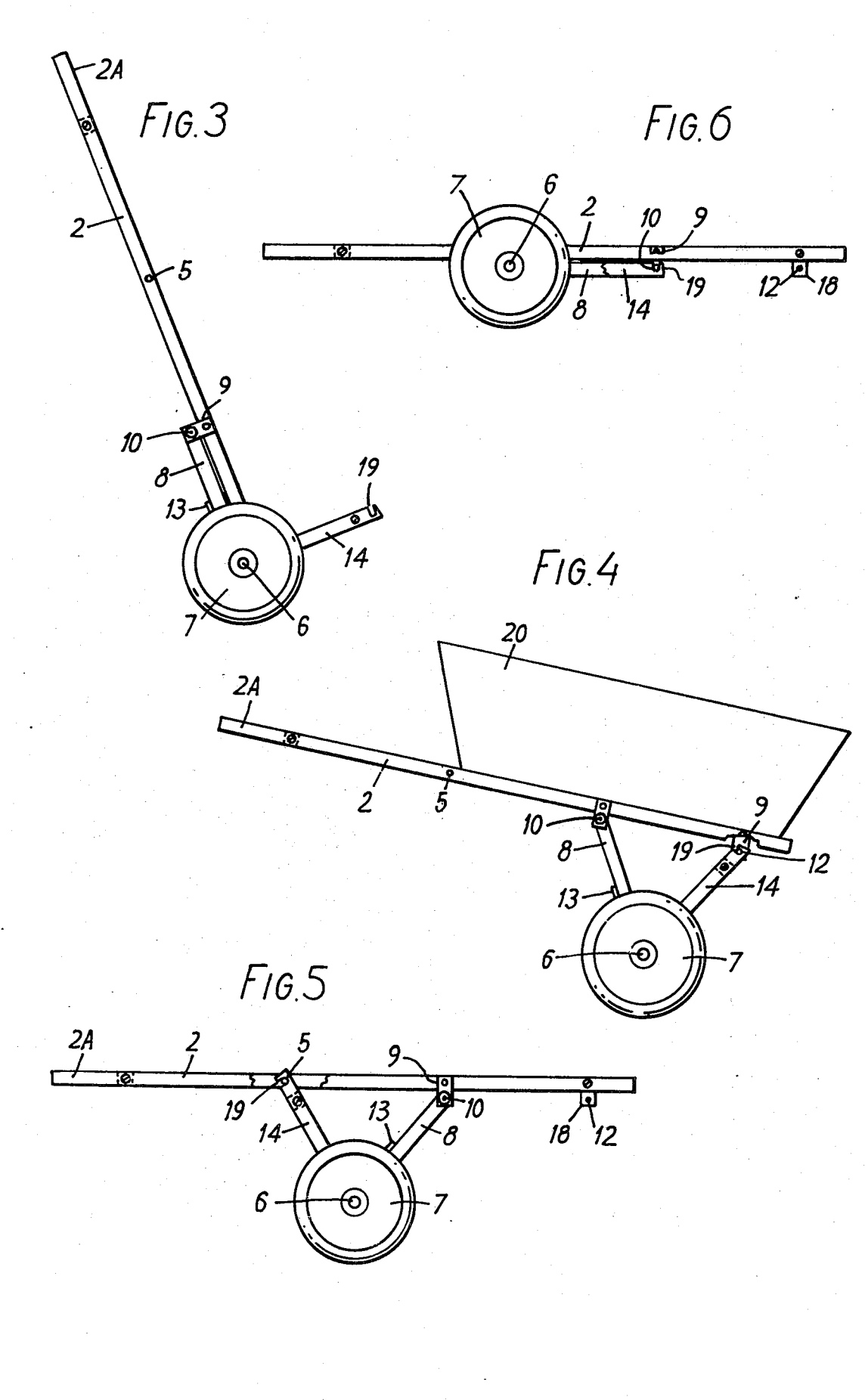

From the position shown in FIG. 2, the bars 14 can be released from the retaining rod 10 and pivoted forwardly (to the right in FIG. 2) between the members 2 until they rest on the cross-bar 4. In this position the bars 14 and cross-bar 15 and plate 13 comprise a load carrying surface as shown in FIG. 3.

The arms 8 can be released from the retaining rod 12 and moved away from the members 2 until the bars 14 can be locked on to the retaining rod 12. In this position either the side members 2 comprise the load carrying surface or a container 20A is mounted on the framework 2 and the wheels 7 are disposed at some distance below the framework and below the container so that the trolley comprises a wheelbarrow as shown in FIG. 4. The container in FIG. 4 may be a box or tray of plastics material. An alternative position in which the arms 2 comprise the load carrying surface is shown in FIG. 5, where the arms 14 are locked on the intermediate transverse rod 5. A position in which the trolley can be used as a low loader is shown in FIG. 6 in which the bars 14 engage on the rod 10.

As shown in FIGS. 4 and 5 the retaining means 19 are attachable alternatively to two retaining rods 12, 5 located on either side of and at some distance from the axis of the support arms whereby the retaining rods 12, 5 and the wheel axis are located at the corners of a triangle in both positions. The retaining means 19 is alternatively attachable to a third retaining member or rod 10 located coaxially with the axis of the arms 8 with the arms and bar parallel to the long sides of the framework.

As shown in FIGS. 2 and 6 the arms 8 lie against the sides of the framework parallel therewith in two different positions of the wheels 7 and the bars 14 lie within the arms 8 parallel therewith in both of these positions.

The ends 2A of the arms 2 are preferably provided with suitable rubber or plastics handles.

Protruding lugs 20 are welded onto the member 2 and act as stops so that the trolley in the FIG. 3 position will stand up, as bars 14 will bear against the lugs 20.

I claim:

1. A trolley comprising a substantially rectangular support framework including side members parallel to each other which at one end serve as handles;

a pair of arms parallel to each other and pivotally mounted at one end thereof on said side members on an axis transverse to said side members between the ends thereof;

ground engaging members mounted on the other ends of said arms;

a first retaining rod carried by said side members transversely thereto near the ends thereof remote from said handles;

a second retaining rod carried by said side members transversely thereto adjacent to the axis of said pair of arms;

a support device pivotally mounted on said arms at the ends thereof remote from the axis of said arms and arranged so as to be movable between said side members;

first retaining means for holding the free ends of said arms (8) removably on to the first retaining rod;

second retaining means for holding the free end of the support device removably on the second retaining rod;

a cross-bar carried by the side members at the ends remote from the handles;

the arrangement being such that the retaining means when engaged hold the said arms and support device parallel to the side members but permit (a) the support device to be moved pivotally between the side members to rest on said cross-bar in V-formation with the side members and arms to form a trolley.

(b) permit the arms to be swung away from the side members and the support device to be engaged with the first retaining rod; and (c) the arms can be swung through 180 degrees and the support device and be engaged with the second retaining rod.

2. A trolley as claimed in claim 1 having a third retaining rod carried by the side members transversely thereof between the handles and the second retaining rod and engageable by the support device with the support device in V-formation with said arms.

3. A trolley as claimed in claim 1 having lugs on the side arms to retain the support device in position (a).

* * * * *